US006782333B2

(12) United States Patent
Baker et al.

(10) Patent No.: US 6,782,333 B2
(45) Date of Patent: Aug. 24, 2004

(54) METER CALIBRATION SYSTEM AND APPARATUS

(75) Inventors: David Baker, Carrollton, TX (US); John Duncan MacIntyre, Nederland, CO (US)

(73) Assignee: Micro Motion, Inc., Boulder, CO (US)

( * ) Notice: Subject to any disclaimer, the term of this patent is extended or adjusted under 35 U.S.C. 154(b) by 34 days.

(21) Appl. No.: 10/161,147

(22) Filed: May 31, 2002

(65) Prior Publication Data

US 2003/0225538 A1 Dec. 4, 2003

(51) Int. Cl.[7] ............................................... G06F 19/00
(52) U.S. Cl. ........................................ 702/104; 73/1.35
(58) Field of Search .................. 702/104, 84; 73/1.04, 73/1.35, 861.357; 700/286, 96; 29/575

(56) References Cited

U.S. PATENT DOCUMENTS

| 899,960 | A | | 5/1908 | Dornin |
| 2,631,451 | A | | 5/1953 | Ford et al. |
| 2,768,522 | A | | 10/1956 | Henke |
| 4,046,462 | A | | 9/1977 | Fletcher et al. .............. 350/295 |
| 4,288,146 | A | | 9/1981 | Johnson, Jr. et al. ........ 350/295 |
| 4,998,431 | A | * | 3/1991 | Jappinen et al. .............. 73/1.04 |
| 5,260,883 | A | * | 11/1993 | Wilson ........................... 703/1 |
| 5,576,500 | A | * | 11/1996 | Cage et al. ............. 73/861.357 |
| 5,706,214 | A | * | 1/1998 | Putt et al. ..................... 700/286 |
| 5,918,191 | A | * | 6/1999 | Patel ........................... 702/84 |
| 6,343,517 | B1 | * | 2/2002 | Van Cleve et al. ..... 73/861.357 |
| 6,360,579 | B1 | * | 3/2002 | De Boom et al. ............ 73/1.35 |
| 6,374,478 | B1 | * | 4/2002 | Neece et al. ................... 29/595 |
| 6,615,091 | B1 | * | 9/2003 | Birchenough et al. ........ 700/96 |

FOREIGN PATENT DOCUMENTS

EP                0 152 268         8/1985    ............ G02B/5/10

* cited by examiner

Primary Examiner—John Barlow
Assistant Examiner—Xiuqin Sun
(74) Attorney, Agent, or Firm—Duft Setter Ollila & Bornsen LLC

(57) ABSTRACT

A meter calibration system and apparatus capable of calibrating meters devoid of process connections. The apparatus are a calibration system and process connection adapters, where in the system is operable for calibrating both linear and nonlinear meters at multiple flow rates, and is suitable for use with both gravimetric and master meter standard references.

27 Claims, 6 Drawing Sheets

METER CALIBRATION SYSTEM AND APPARATUS

FIELD OF INVENTION

This invention pertains to systems that are used in calibrating meters for purposes of assuring accuracy from the meter being calibrated. More specifically, the system enables the calibration of volumetric flowmeters, mass flowmeters, densitometers, and viscometers devoid of process connection.

PROBLEM

It is desirable to perform a calibration on all meters prior to use in order to ensure accurate and reliable measurement data. The purpose of a meter calibration effort is to ascertain a flow calibration factor that will be used as a multiplier in correcting direct measurements from the meter under test. Coriolis meters, orifice meters, and positive displacement meters are known in the art as linear meters, i.e., the flow calibration factor is a constant with respect to flow rate. Other meters, including magnetic flow and vortex types, are nonlinear meters meaning that the flow calibration factor varies with respect to flow rate.

The calibration process typically is performed on a meter with process connections already attached as per a customer order. The meter is inserted into the calibration system having process connections that match those already attached to the meter. After insertion into the calibration system, the calibration process is performed. The most reliable calibration systems include gravimetric standards or master meter transfer standards used as flow rate references during the calibration process. The fluid used within the calibration system and the meter under test has precisely known intrinsic and extrinsic fluid properties, e.g., temperature, density, viscosity, and volume. The meter under test performs flow measurements on this fluid. These measurements are compared with the known fluid properties or flow rate reference to ascertain or validate a flow calibration factor or other calibration factors for the meter under test.

The problem with the above procedure is the requirement to have customer-specific process connections attached to the meter prior to performing the calibration. There are several drawbacks associated with this requirement.

One drawback is related to capital expenditure. In an effort to minimize warehouse inventory, meter manufacturers defer the process connection attachment step until a customer places an order. Furthermore, in an effort to reduce customer delivery lead-time, meter manufacturers locate customer service facilities around the world as near as possible to customers. As a result, since the calibration step currently follows the process connection attachment step, expensive calibration system hardware must be replicated in several facilities around the world.

Another drawback is the inability to test a meter for functional discrepancies immediately following meter assembly and prior to the meter proceeding through the process connection attach, calibration and shipping functions. With the current process, a discrepant meter would not be identified until it has completed its route through the customer service facility. Identifying the discrepant meter at the end of the process results in extremely high scrap costs and a delay in delivery to the customer.

For the reasons given above, a need exists for a meter calibration system with sufficient accuracy that enables calibration of meters devoid of process connections. Moreover, the system should be capable of calibrating both linear and nonlinear meters and should not reduce the current system's performance or capabilities.

SOLUTION

This invention overcomes the problems outlined above and advances the art by providing methods and apparatus capable of calibrating meters devoid of process connections. The apparatus are a calibration system and process connection adapters, where the system is operable for calibrating both linear and nonlinear meters at multiple flow rates, and is suitable for use with both gravimetric and master meter standard references.

One embodiment of the present invention is a process connection adapter used to fluidly connect a calibration system with a test meter devoid of process connections. The process connection adapter is an apparatus composed of a system mating portion, an intermediate portion, and a meter mating portion. The system mating portion is designed to physically match a connection on the calibration system. Typically this connection is in the form of a flange, sanitary fitting, union fitting, or some other type of sealing connection for piping. The intermediate portion transitions the flow area of the system mating portion to the flow area of the meter mating portion. The meter mating portion incorporates mechanical features to physically match a portion of the meter that would typically have a process connection attached to it. Depending on the connection type used by the system, a sealing component may be required to ensure that the interfaces between the process connection adapters, the calibration system, and the test meter are leak-free. Such a component could be an O-ring or gasket seal. During meter installation into the calibration system, the process connection adapters can either be secured to each of its mating members through bolts or other fittings or simply compressed as an assembly between hydraulic or pneumatic actuators.

The order fulfillment process begins by receiving a meter, devoid of process connection, from the manufacturing facility. Next, process connection adapters are attached on each end of the meter to form a test assembly. The test assembly is then mounted in the test bed by placing a portion of the test assembly on support structures integrated in the calibration system. Once the test assembly is fixed into the support structures, hydraulic or pneumatic actuators compress the calibration system connectors against the process connection adapters. This compression capability enables quick and easy insertion and removal of the test assembly while also ensuring a leak-free fluid path. Once the test assembly is inserted into the calibration system, the meter signal cabling is attached to the controller and the calibration process is started.

The basic meter calibration system includes a mechanism for supplying fluid to use in flow calibration measurements, a flow and density measurement reference, a controller for automating the system in order to optimize the accuracy or sensitivity of the measurements, and, of course, a meter under test. The flow measurements are used to ascertain or validate a flow calibration factor for the meter under test. The same principles apply for mass flow rate, volumetric flow rate, density, or viscosity calibrations.

The fluid supply mechanism can provide any fluid type; e.g., a liquid reservoir and a pump; a multiphase fluid including multiple immiscible liquid phases and gas; an attachment to a pressurized water supply, such as plant process fluids, a city water supply, artesian well, or gravimetric system; or a pressurized gas supply, such as natural gas, air, or plant process gases. For most meter calibrations, a constant-pressure source of water is the preferred supply mechanism.

The meter is operably configured, as described above, to receive fluid from the fluid supply mechanism. The meter under test is positioned in the flow piping between the fluid supply and either a scale, as in the case of a gravimetric system, or a master meter array as in a master meter system, described in U.S. Pat. No. 6,360,579 issued to DeBoom et al.

Once the calibration process is started, the meter under test provides flow measurement signals to a supervisory CPU-based controller. The controller adjusts valves leading to the meter for the purpose of controlling flow through the meter within the range of optimal measurement sensitivity corresponding to relatively low uncertainty for the meter. The controller interprets these electrical signals as flow measurement data and calibrates the meter under test using a flow calibration factor obtained from flow data.

BRIEF DESCRIPTION OF THE DRAWINGS

These and other advantages and features of the present invention may be better understood in connection with a reading of the following detailed description of one possible exemplary embodiment thereof taken in conjunction with the drawings in which.

DETAILED DESCRIPTION OF THE INVENTION

The present invention is directed toward methods and apparatus used in calibrating meters devoid of process connections for the purposes of assuring measurement accuracy. The apparatus can include a flow calibration unit and associated adapters for connecting and calibrating meters without process connections. Many specific details of certain embodiments of the invention are set forth in the following description and in FIGS. 1–8 to provide a thorough understanding of such embodiments. One skilled in the art, however, will understand that the present invention may have additional embodiments and that they may be practiced without several of the details described in the following description.

Figure 1:
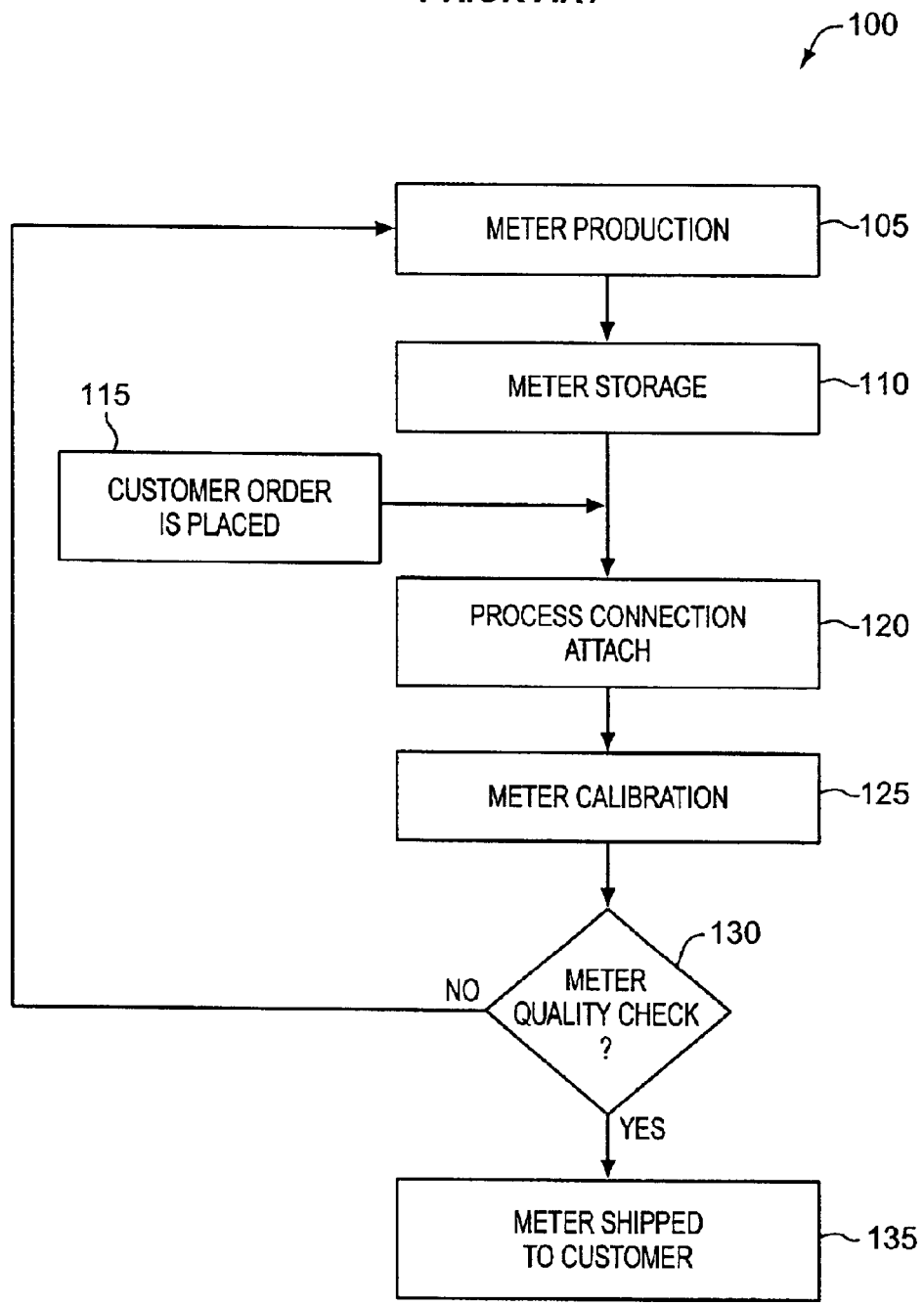
FIG. 1 is a process schematic diagram showing the flow process for a meter calibration system according to the prior art.

FIG. 1 is a process schematic diagram showing a process 100 of how a meter is routed from production to shipment to a customer according to the prior art. Step 105 involves the production of a meter from component or piece parts. This production includes all assembly, welding and finishing processes up to but not including the attachment of process connections. After the meter has completed production, the meter is then shipped to a storage area in step 110 to await a customer order In step 115, a customer orders a meter based on customer requirements, including flow rate, fluid type and line pressure. Based on the customer's requirements, an order is placed in manufacturing for a meter with a specific process connection attached. Various types of process connections exist, including flanges, union fittings, sanitary, etc.

Step 120 entails the connection of the process connections ordered by the customer. The meter and process connections are attached using either an automated or manual welding station.

After the meter has been built, it is calibrated as shown in step 125. Depending on the meter type and size, a calibration facility requires between 2 and 3 calibration systems. Calibration units can cost as much as $450,000 dollars and can take up as much as 800 sqft. Due to the cost and size of these systems, limiting the number of installations is desirable. Not only is the size and cost a consideration, but also calibration is a time-consuming process. The calibration process is subsequently described in further detail.

Once the meter has been calibrated, a quality check is performed in step 130. Then, the meter is shipped to the customer as denoted by step 135. The quality check involves, among other things, the meter's adherence to strict performance standards as well as its conformity to manufacturing standards. If, for any reason, the meter does not meet the quality standards, it is routed back to manufacturing for further disposition while a replacement meter is substituted for order fulfillment. Unfortunately, the labor and materials expended during the process connection attachment and calibration steps are wasted since the quality assurance check occurs at the end of all manufacturing steps.
Description of FIG. 2

Figure 2:
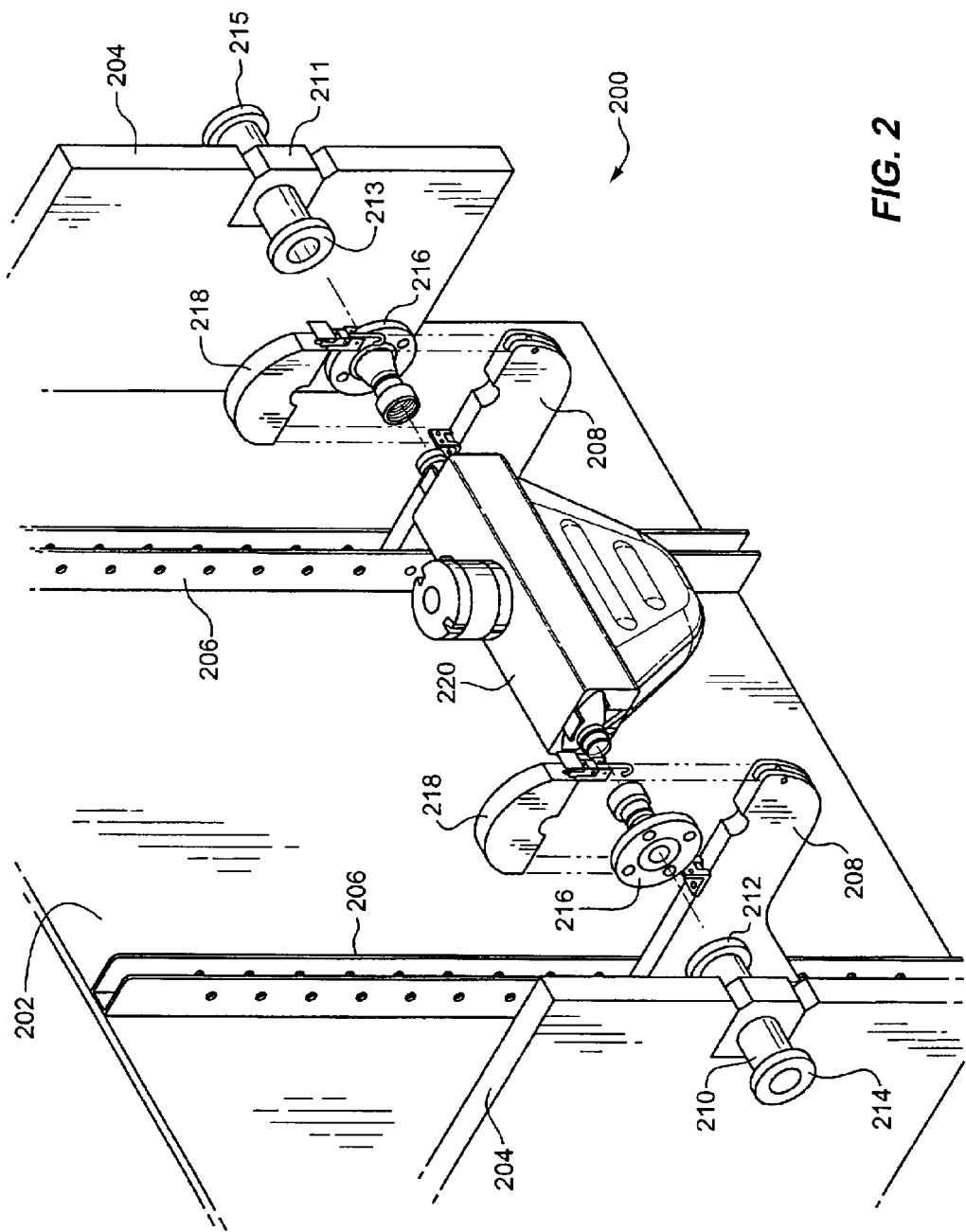
FIG. 2 discloses a calibration installation according to an embodiment of the present invention.

FIG. 2 discloses a calibration installation according to an embodiment of the present invention. A meter support 200 is comprised of a back support 202 and two side supports 204. The back support 202 has attached to it guides 206 for enabling process connection supports 208 to be installed and adjusted, up or down, depending on the size and type of flow meter under test. Incorporated on the side supports are the process fluid inlet 210 and outlet 211 for conveying process fluid through the process connection adapters 216 and the test meter 220.

Once the test meter 220 has the process connection adapters attached onto each end of the test meter 220, the assembly is placed on process connection supports 208 and locked down with clamps 218. The process fluid inlet 210 and outlet 211 are then pressed against the process connection adapters, thereby creating a leak-free fluid path.
Description of FIGS. 3 and 4

Figure 3:
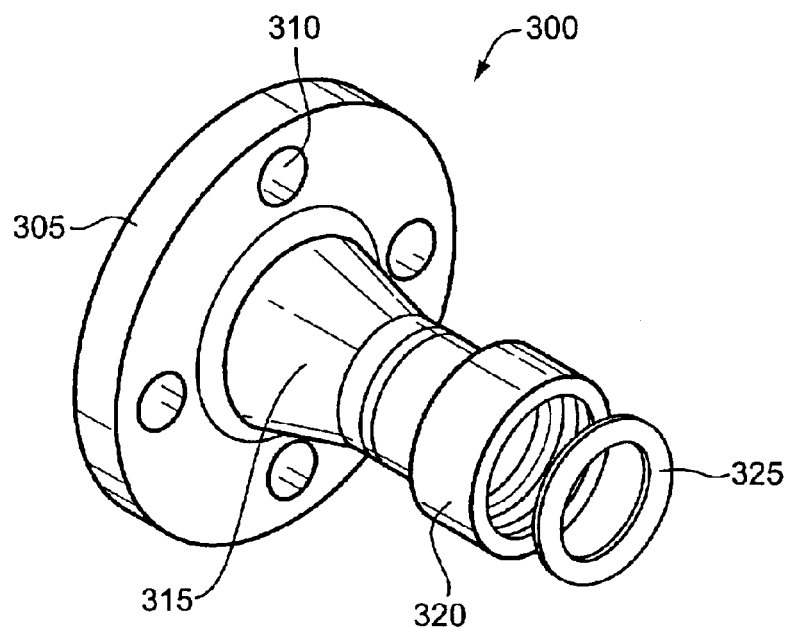
FIG. 3 depicts a process connection adapter.
Figure 4:
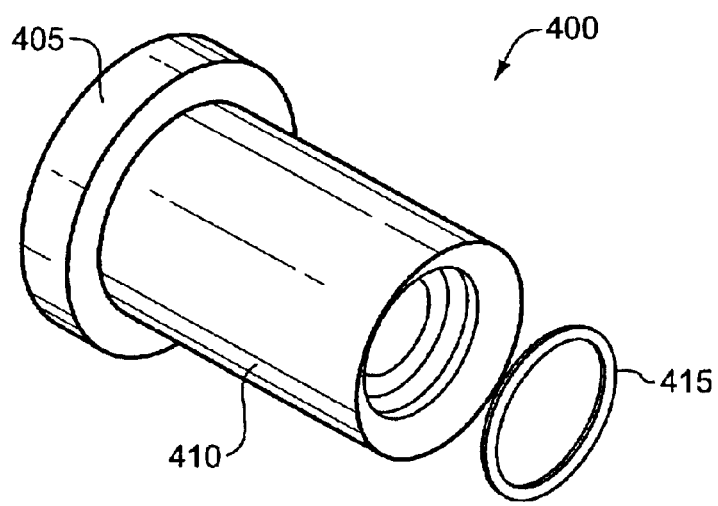
FIG. 4 depicts an additional process connection adapter.

FIGS. 3 and 4 are exploded views of different types of process connection adapters that may be used to install a meter devoid of process connections into a calibration system. FIG. 3 is a process connection adapter 300 that is designed to act as a mock flange connection. The process connection adapter 300 comprises a disc portion 305 with bolt holes 310 that may be used to connect to a mating flange on the calibration system. From the disc 305, the adapter reduces in size to a neck portion 315 and truncates at the meter mating portion 320. The meter mating portion 320 may further contain a sealing mechanism 325 (e.g. an O-ring) to ensure a leak-free seal between the test meter 220 and the process connection adapter 300.

FIG. 4 is a process connection adapter 400 designed to act as a mock sanitary connection. The process connection adapter 400 comprises a disc portion 405 that interfaces with either the process fluid inlet 210 or outlet 211 of the calibration system piping. From the disc 405, the adapter reduces to a meter mating portion 410. The meter mating portion 410 may further contain a sealing mechanism 415 (e.g. an O-ring) to ensure a leak tight seal between the test meter 220 and the process connection adapter 400.

Figure 5:
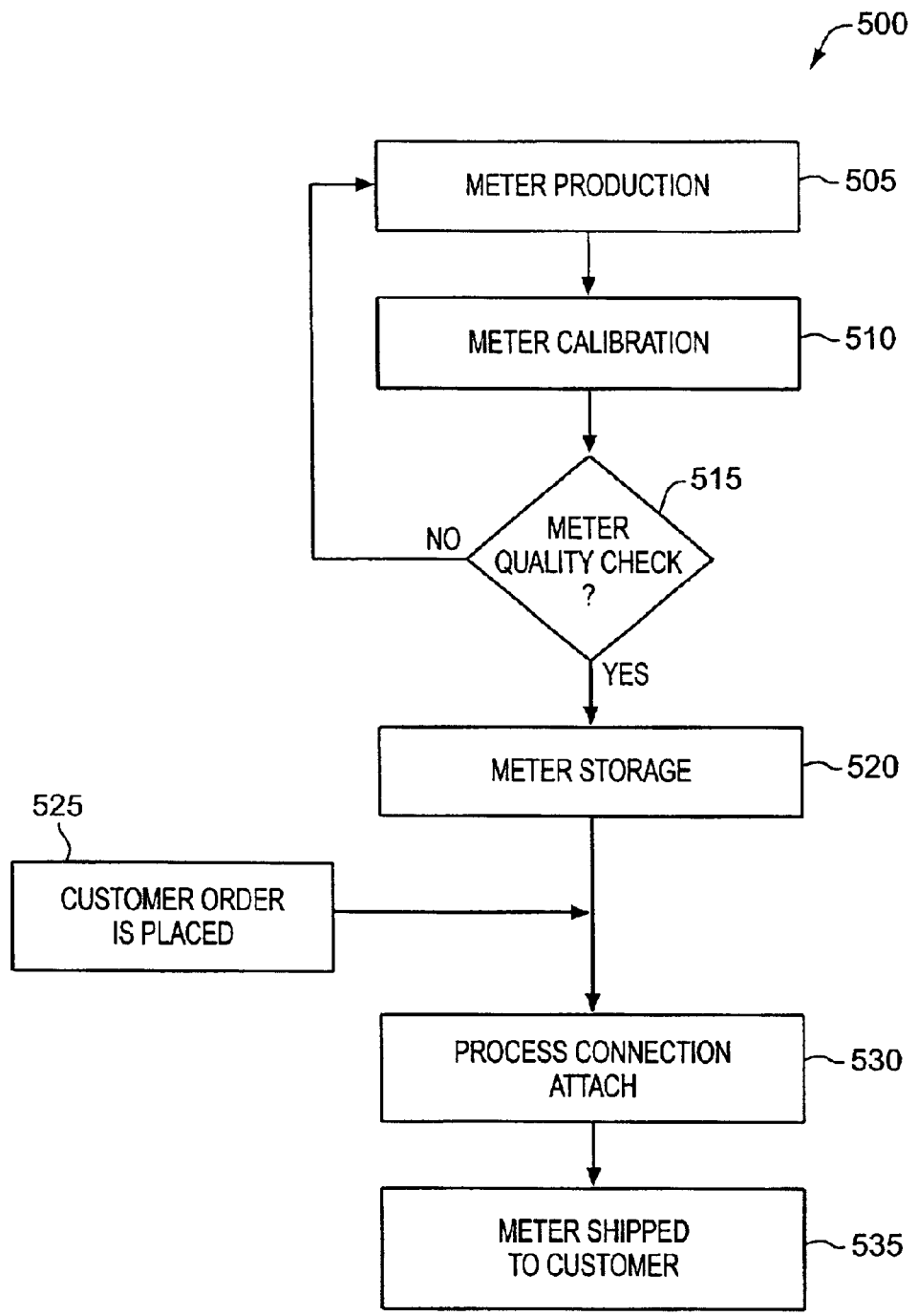
FIG. 5 is a process schematic diagram showing the flow process for a meter calibration system according to the present invention.

Description of FIG. 5

FIG. 5 is a process schematic diagram showing a process 500 of how a meter is routed from production to shipment to a customer according to one possible exemplary embodiment of the invention. Step 505 involves the production of a meter from component or piece parts. This production includes all assembly, welding and finishing processes up to but not including the attachment of process connections.

After the meter has completed production, the meter is then calibrated as shown in step 510. The calibration process differs for that in FIG. 1 step 125 in that the meter is calibrated without process connections. Compared to the process in FIG. 1, this process enables completion of more steps prior to customization based on a customer's order. Once the meter has been calibrated, it is put through a battery of tests to verify its adherence to strict quality standards as denoted by step 515. If the meter fails to pass any of the quality tests, it is routed back to meter production for further disposition. However, if the meter passes the quality test, it is forwarded to meter storage as depicted by step 520. Due to the fact that all calibration and quality check procedures have been performed on the meter, the storage facility can be located in any part of the world. It is not necessary, as in the prior art process denoted by FIG. 1, for the storage facility to have costly calibration systems. It is only necessary that the facility have capabilities for attaching process connections, a relatively inexpensive capital investment and relatively less labor-intensive operation.

In step 525, a customer orders a meter based on many criteria, including flow rate, fluid type and line pressure. Based on the customer's requirements, an order is placed in manufacturing for a meter with a specific type of process connection.

The meter type ordered by the customer is retrieved from storage and the process connection attachment is performed as shown in step 530. The meter and process connections are attached using either an automated or manual welding station. As mentioned above, the relatively low cost of the welding stations enable their use in many locations.

After the meter has the process connections attached, it is shipped to the customer as shown in step 535. The benefit of the described process over the prior art is the ability to maintain meter inventories at multiple locations throughout the world while minimizing capital cost. This strategy improves the response time to a customer's order by locating the customer specific operations close to the customer, while limiting the locations performing labor and capital-intensive operations such as manufacturing, calibration, and quality testing.

Figure 6:
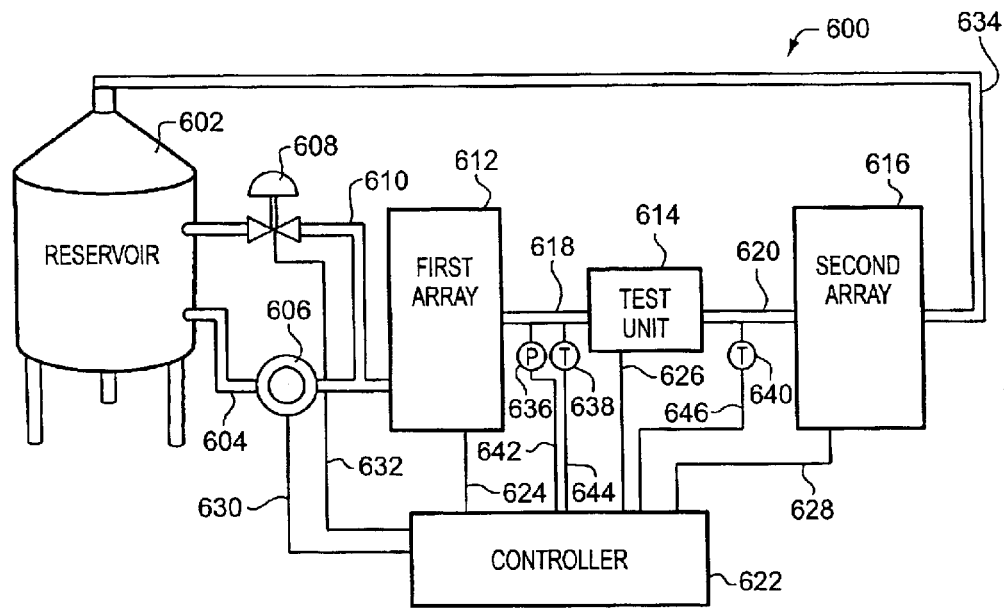
FIG. 6 depicts a block schematic diagram of the flow process for a meter calibration system according to the present invention.

Description of FIG. 6

As mentioned previously, the ability to calibrate meters early in the work-flow process is beneficial because of the time and costs associated with a calibration system. One such system is a master meter calibration system of the present invention, as shown in FIG. 6. FIG. 6 depicts a meter calibration system 600. A reservoir 602 contains water or another liquid, which is pressurized in tubing 604 by the action of gravity and an optional pump 606. An automated valve 608 may be partially opened to permit a portion of the flow from pump 606 to bypass flow through system 600. A first meter array 612 is positioned to receive liquid from tubing 604 under the pressure influence of pump 606. The term "array" is used to denote a grouping of flow meters. A meter under test or test unit 614 is positioned between first meter array 612 and a second meter array 616. The term "test unit" is used here because a single meter may be tested or a plurality of similar meters may be connected in series for simultaneous calibration testing. The testing of meters in series significantly enhances the test process efficiency because flow measurement data from a single test perceived by first meter array 612 and second meter array 616 can be used to calibrate each meter in series within test unit 614, as opposed to having to run separate volumes through the arrays while testing each meter.

Test unit 614 receives liquid through tubular segment 618 and, in turn, passes this liquid to second meter array 616 through tubular segment 620. A CPU-based controller 622 is in electrical contact with each of first meter array 612, test unit 614 and second meter array 616 through corresponding cables 624, 626, and 628. Controller 622 is also in electrical contact with pump 606 and valve 608 through corresponding cables 630 and 632. Tubing 634 provides a return of fluid from second meter array 616 to reservoir 602.

A pressure indicating recorder 636 and a temperature indicating recorder 638 are mounted in tubular segment 618, i.e., upstream of test unit 614. A temperature indicating recorder 640 is mounted in tubular segment 620, i.e., downstream of test unit 614. These devices are in operable contact with controller 622 through cables 642, 644, and 646 for the receipt and transmission of signals. The pressure indicating recorder 636, temperature indicating recorder 638, and temperature indicating recorder 640 provide data that is used according to conventional practices in obtaining density measurements from test unit 614 when it contains a Coriolis flowmeter. Pressure and temperature data from the positions shown for pressure indicating recorder 636, temperature indicating recorder 638, and temperature indicating recorder 640, are also required to perform volumetric measurements when the test unit 614 contains a volumetric flow meter, such as a positive displacement meter or orifice meter.

In operation, the meter under test 614 has been newly manufactured or recently removed from a normal service position (not depicted in FIG. 6). Meter under test 614 has just been installed into position contacting tubular segments 618 and 620 for calibration test purposes, and the portion of system 600 downstream of reservoir 602 has been bled of air and other gasses. Controller 622 actuates pump 606 to flow liquid from within reservoir 602 in series into first meter array 612, meter under test 614 and second meter array 616, which each perform simultaneous flow measurements on the liquid. Controller 622 synchronizes these simultaneous measurements. The synchronous measurements avoid the possibility of obtaining flow measurements at different times where the flow measurements may be influenced by pressure surges or pulses from the action of pump 606. Controller 622 operates, as described in greater detail below, to assure that respective meters within second meter array 616 are operating at flow rates making it at least ninety-five percent certain that the uncertainty of measurements obtained from second meter array 616 are at least three times more accurate than the manufacturer's performance specification that is allocated to meter under test 614.

Figure 7:
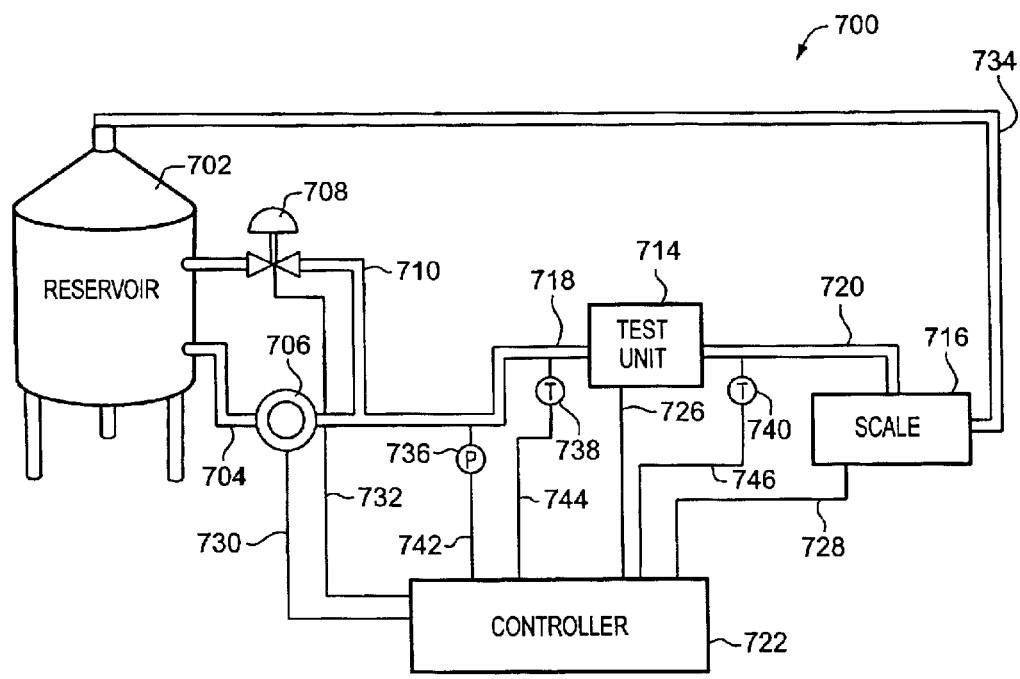
FIG. 7 depicts a block schematic diagram of the flow process for a meter calibration system according to another embodiment.

Description of FIG. 7

FIG. 7 depicts another form of the calibration system called a gravimetric scale system 700. A reservoir 702 contains water or another liquid, which is pressurized in tubing 704 by the action of gravity and an optional pump 706. An automated valve 708 may be partially opened to permit a portion of the flow from pump 706 to bypass flow through system 700. A meter under test or test unit 714 is positioned between first meter array 712 and a second meter array 716. The term "test unit" is used here because a single meter may be tested or a plurality of similar meters may be connected in series for simultaneous calibration testing. The testing of meters in series significantly enhances the test process efficiency because flow measurement data from a single test can be used to calibrate each meter in series within test unit 714.

Test unit 714 receives liquid through tubular segment 718 and, in turn, passes this liquid to a scale 716 through tubular segment 720. A CPU-based controller 722 is in electrical contact with each of test unit 714 and scale 716 through corresponding cables 726, and 728. Controller 722 is also in electrical contact with pump 706 and valve 708 through corresponding cables 730 and 732. Tubing 734 provides a return of fluid from scale 716 to reservoir 702.

A pressure indicating recorder 736 and a temperature indicating recorder 738 are mounted in tubular segment 718, i.e., upstream of test unit 714. A temperature indicating recorder 740 is mounted in tubular segment 720, i.e., downstream of test unit 714. These devices are in operable contact with controller 722 through cables 742, 744, and 746 for the receipt and transmission of signals. The pressure indicating recorder 736, temperature indicating recorder 738, and temperature indicating recorder 740 provide data that is used according to conventional practices in obtaining density measurements from test unit 714 when it contains a Coriolis flowmeter. Pressure and temperature data from the positions shown for pressure indicating recorder 736, temperature indicating recorder 738, and temperature indicating recorder 740, are also required to perform volumetric measurements when the test unit 714 contains a volumetric flow meter, such as a positive displacement meter or orifice meter.

In operation, the meter under test 714 has been newly manufactured or recently removed from a normal service position (not depicted in FIG. 7). Meter under test 714 is installed into position contacting tubular segments 718 and 720 for calibration test purposes, and the portion of system 700 downstream of reservoir 702 has been bled of air and other gasses. Controller 722 activates pump 706 to flow liquid from within reservoir 702 in series into meter under test 714 and scale 716, which each perform simultaneous measurements on the liquid. Controller 722 synchronizes these simultaneous measurements.

Figure 8:
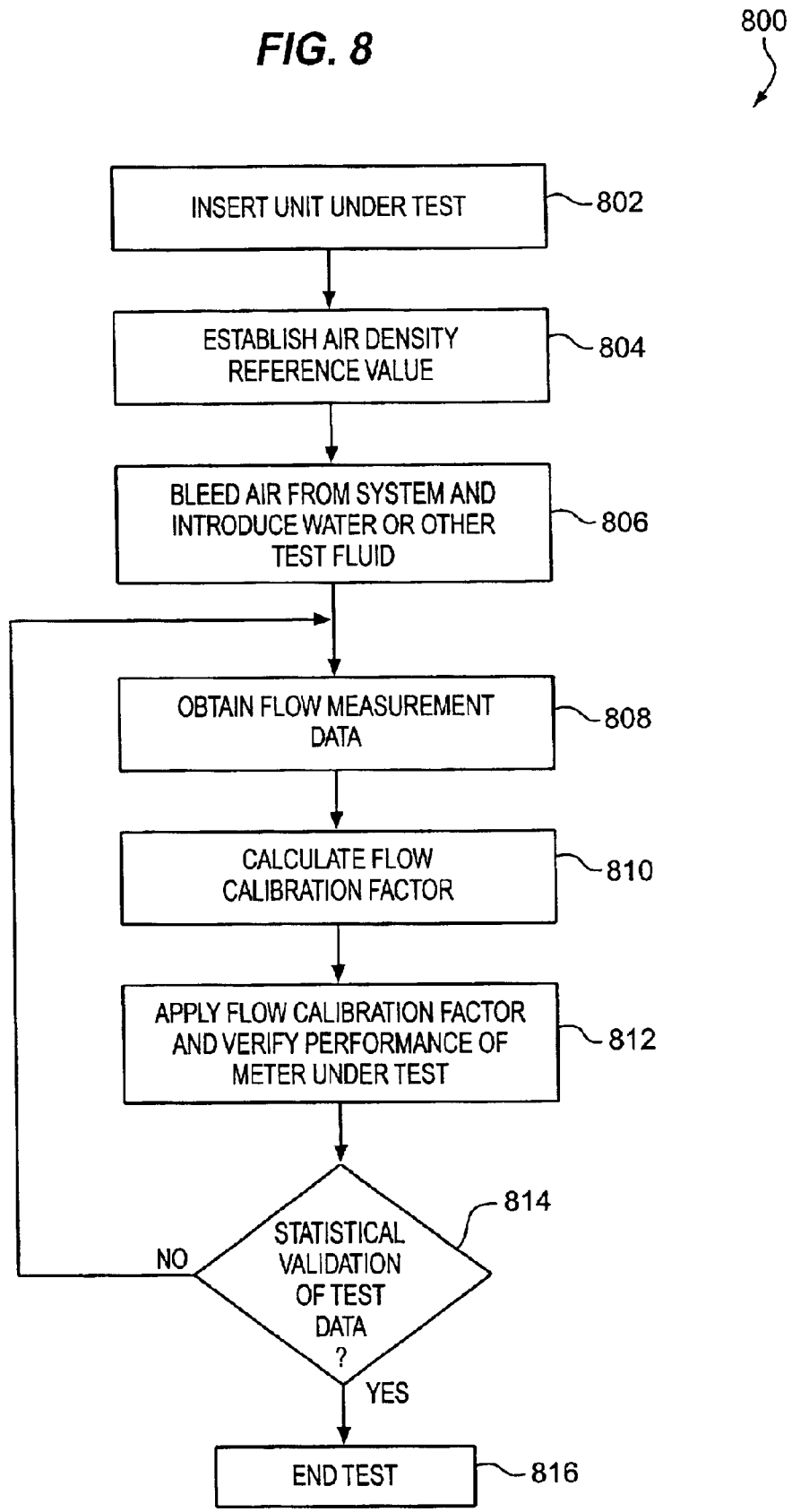
FIG. 8 discloses a process schematic diagram showing the calibration process.

Description of FIG. 8

FIG. 8 depicts a schematic block process diagram showing a process 800 of meter calibration as described in step 510 from FIG. 5. The discussion of the steps of FIG. 8 is framed in the context of reference numbers of the apparatus of FIG. 6.

Step 802 entails inserting a unit under test. This assembly typically includes inserting process connection adapters on to each end of the test unit 614 and compressing the process connection adapters between tubular segments 618 and 620. Test unit 614 is typically held in place between tubular segments 618 and 620 by a hydraulic or pneumatic actuator.

Test unit 614 is normally filled with air after the unit under test has been properly installed in step 802. A pressurized air source is used to blow liquid from the system, if needed, prior to determining an air density reference value from each individual meter in the test unit 614, pursuant to step 804.

According to step 806, air is next bled from the system and water or another test fluid is introduced into the test unit 614. The test fluid can be air, in which case air does not need to be bled from the system and step 806 can be skipped.

Controller 622 opens automated valves (not shown) and uses liquid from pump 606 to purge the test unit 614. Alternatively, controller 622 can open valves for return of fill liquid to reservoir 602 if residual fluid and/or particles inside test unit 614 will not contaminate the fluid in the reservoir.

In step 808, controller 622 activates pump 606 to flow water from reservoir 302 or permits fluid from another source to flow fluid through flow calibration system 600. Controller 622 also determines the flow rate for the calibration test based upon operator input identifying the type or types of meters in the unit under test and a lookup table or database of appropriate test profile information for each meter. The operator can also input the test profile information to override or supplement test profile information in the database. Controller 622 then selectively opens and closes the automated valves to match the test profile.

Controller 622 is preferably configured to obtain simultaneous readings from each active meter in first meter array 612, second meter array 616, and the test unit 614. This synchronization avoids the possibility that pressure surges through the system 600 could skew the measurement results if controller 622 polls the respective meters at different times. This flow measurement data can be quickly obtained, e.g., seven measurement points can be obtained in two to three minutes.

In step 810, the flow measurement data from second meter array 616 is used to calculate a flow calibration factor or calibration equation that is compatible with the type of meter under test in test unit 614. The flow calibration factor calculation is performed according to the manufacturer's specifications, and the manner of this calculation is preferably kept in the same database or lookup table that is used to identify the test profile in step 808.

Step 812 entails additional flow measurement testing to verify performance of the meter under test using the flow calibration factor that was calculated in step 810. Controller 622 again synchronizes measurements from all of the active meters in flow calibration system 600.

In step 814, the controller 622 checks each measurement signal from steps 808 and 812 and compares the cumulative signals (e.g., representing total flow rate amounts from two meters in first meter array 612) that are obtained from one array at a single time against the cumulative signals from the other array at the same time. The comparison entails subtracting one signal from the other and determining whether the difference exceeds an uncertainty limit.

It is to be expressly understood that the claimed invention is not to be limited to the description of the preferred embodiment but encompasses other modifications and alterations within the scope and spirit of the inventive concept. For example, the term "material" encompasses fluids, gases, liquids and any other element that can be made to flow through a meter.

What is claimed is:

1. A meter calibration system configured to calibrate a meter devoid of process connections, comprising:

process connection adapters for connecting the meter under test to the calibration system;

a source for flowing a process material through the calibration system and meter;

an apparatus that generates measurement signals in response to said material flow; and a controller configured to process measurement signals derived from the calibration system and the meter to derive calibration information.

2. The meter calibration system of claim 1 wherein the process connection adapters are configured to emulate a process connection that may be subsequently attached to the meter.

3. The meter calibration system of claim 2 wherein the process connection adapters are configured to emulate flange process connections.

4. The meter calibration system of claim 2 wherein the process connection adapters are configured to emulate sanitary process connections.

5. The meter calibration system of claim 1 further comprising a master meter for supplying measurement signals to said controller for use in deriving said calibration information.

6. The meter calibration system of claim 1 further comprising a scale for supplying measurement signals to said controller for use in deriving said calibration information.

7. The meter calibration system as set forth in claim 1 wherein the meter under test is a Coriolis meter.

8. The meter calibration system as set forth in claim 1 including a test unit comprising serially-connected meters under test.

9. The meter calibration system as set forth in claim 1 wherein said process connection adapters are compressively held onto a meter input and output.

10. The meter calibration system as set forth in claim 1 wherein said process connection adapters are integrated into the calibration system.

11. A method of calibrating a meter under test devoid of process connections, the method comprising the steps of:
   connecting a first process connection adapter to an input of said meter and a second process connection adapter to an output of said meter to form a series connection with said meter;
   flowing serially through said first process connection adapter, said meter, and said second process connection adapter;
   generating measurement signals in response to said flow; and
   processing measurement signals to derive calibration information for the meter.

12. The method of claim 11 wherein the step of connecting process connection adapters includes the step of using process connection adapters that are configured to emulate a process connection that may be subsequently attached to the meter.

13. The method of claim 12 wherein the step of using process connection adapters that are configured to emulate a process connection that may be subsequently attached to the meter further includes the step of using process connection adapters that are configured to emulate flange process connections.

14. The method of claim 12 wherein the step of using process connection adapters that are configured to emulate a process connection that may be subsequently attached to the meter further includes the step of using process connection adapters that are configured to emulate sanitary process connections.

15. The method of claim 11 wherein the step of processing measurement signals includes the step of using measurement signals from a master meter to derive said calibration information.

16. The method of claim 11 wherein the step of processing measurement signals includes the step of using measurement signals from a scale to derive said calibration information.

17. The method of claim 11 includes the step of calibrating a Coriolis meter.

18. The method of claim 11 further including the step of compressively holding said process connection adapters onto a meter input and output.

19. The method of claim 11 wherein the step of connecting process connection adapters includes the step of connecting the process connection adapters to a test unit comprising serially-connected meters under test.

20. A process connection adapter, comprising
   a first end portion configured to connect to a meter devoid of process connections;
   a second end portion configured to connect to a calibration system; and
   an intermediate portion for transitioning said first end portion to said second end portion.

21. The process connection adapter as set forth in claim 20 wherein the process connection adapter is configured to emulate a process connection that may be subsequently attached the meter.

22. The process connection adapter of claim 21 wherein the process connection adapters are configured to emulate flange process connections.

23. The process connection adapter of claim 21 wherein the process connection adapters are configured to emulate sanitary process connections.

24. The process connection adapter of claim 20 further including means for ensuring a leak-free seal between the process connection adapter and the meter.

25. The process connection adapter of claim 24 wherein the means for ensuring a leak-free seal between the process connection adapter and the meter is an O-ring.

26. The process connection adapter of claim 20 further including means for ensuring a leak-free seal between the process connection adapter and the calibration system.

27. The process connection adapter of claim 26 wherein the means for ensuring a leak-free seal between the process connection adapter and the calibration system is an O-ring.

* * * * *